(12) United States Patent
Yao et al.

(10) Patent No.: US 7,973,494 B2
(45) Date of Patent: Jul. 5, 2011

(54) ELECTRONIC BALLAST WITH STEP UP/DOWN POWER FACTOR CORRECTION DC-DC CONVERTER SUITABLE FOR HIGH INPUT VOLTAGE APPLICATIONS

(75) Inventors: Gang Yao, ShangHai (CN); Xuefei Xie, ShangHai (CN)

(73) Assignee: General Electric Company, Schenectady, NY (US)

( * ) Notice: Subject to any disclaimer, the term of this patent is extended or adjusted under 35 U.S.C. 154(b) by 216 days.

(21) Appl. No.: 12/507,892

(22) Filed: Jul. 23, 2009

(65) Prior Publication Data

US 2010/0289423 A1    Nov. 18, 2010

(30) Foreign Application Priority Data

May 13, 2009    (CN) .......................... 2009 1 0159523

(51) Int. Cl.
*H05B 37/00*    (2006.01)

(52) U.S. Cl. ............................ 315/291; 315/224; 363/52
(58) Field of Classification Search ......... 315/207–209 R, 315/222, 224, 307, 291; 363/50–55
See application file for complete search history.

(56) References Cited

U.S. PATENT DOCUMENTS

| | | | |
|---|---|---|---|
| 7,109,659 B2 * | 9/2006 | Kamoi | 315/88 |
| 7,190,151 B2 * | 3/2007 | Ribarich et al. | 323/259 |
| 7,391,630 B2 * | 6/2008 | Acatrinei | 363/89 |
| 7,529,107 B2 * | 5/2009 | Mehta | 363/53 |
| 7,894,216 B2 * | 2/2011 | Melanson | 363/21.13 |
| 2006/0170399 A1 | 8/2006 | Griffin | |

* cited by examiner

*Primary Examiner* — Don P Le
(74) *Attorney, Agent, or Firm* — Fay Sharpe LLP

(57) ABSTRACT

Electronic ballasts and buck-boost DC-DC converters therefor are presented with a buck converter with two switching devices connected with two capacitances and two diodes to limit the individual switching device voltages to around half the converter DC input voltage or less.

21 Claims, 9 Drawing Sheets

ELECTRONIC BALLAST WITH STEP UP/DOWN POWER FACTOR CORRECTION DC-DC CONVERTER SUITABLE FOR HIGH INPUT VOLTAGE APPLICATIONS

CROSS-REFERENCE TO RELATED APPLICATIONS

This application claims priority to and the benefit of Chinese patent application No. 200910159523.X, filed May 13, 2009, the entirety of which is hereby incorporated by reference.

BACKGROUND OF THE DISCLOSURE

In the artificial illumination arts, DC-DC converters are often employed in electronic ballasts to perform step or step down transformation of rectified input power prior to inversion to drive a lamp load. In high input voltage applications, the rectified input voltage may exceed the maximum voltage rating of medium voltage switches in conventional buck-boost and other DC-DC converter architectures. Accordingly, conventional ballast DC-DC converters required the use of expensive high voltage electronic components, such as switches rated for 1000V or more. In addition to the increased cost and component availability issues, such devices may suffer from high levels of conduction losses and thus present efficiency problems for the ballast. Accordingly, there is a need for improved DC-DC converters for high voltage electronic ballasts by which the above and other shortcomings of conventional devices can be mitigated or overcome.

SUMMARY OF THE DISCLOSURE

An electronic ballast and DC-DC converters for electronic ballasts are disclosed. The ballast includes a rectifier that provides a rectified DC voltage from input AC electrical power as well as a buck-boost DC-DC converter and an inverter that provides an AC output to drive a lamp. The DC-DC converter includes a buck converter which converts the rectifier output into an intermediate DC, as well as a boost converter that converts the intermediate DC into a converter DC output for providing DC power to the inverter. The buck converter includes two capacitances in a first circuit branch across the rectifier output, first and second diodes in a second circuit branch across a buck converter output, and first and second switching devices coupled between the rectifier output and the buck converter output to provide the intermediate DC voltage at the buck converter output according to one or more buck converter control signals.

A DC-DC converter is provided for converting a rectified DC voltage to a converter DC output voltage in an electronic ballast. The DC-DC converter includes a buck converter to convert a rectifier output into an intermediate DC, and a boost converter to convert the intermediate DC into a converter DC output. The buck converter includes two switching devices, two capacitances in a first circuit branch across a rectifier output, and two diodes in a second circuit branch across a buck converter output, where the buck converter switching devices are coupled between the rectifier output and the buck converter output to provide the intermediate DC voltage at the buck converter output according to one or more buck converter control signals.

BRIEF DESCRIPTION OF THE DRAWINGS

One or more exemplary embodiments are set forth in the following detailed description and the drawings, in which:

FIG. 7 is a schematic diagram illustrating another exemplary operational state of the converter embodiment of FIGS. 4-6 with all three switching devices ON;

DETAILED DESCRIPTION OF THE PREFERRED EMBODIMENTS

Figure 1:
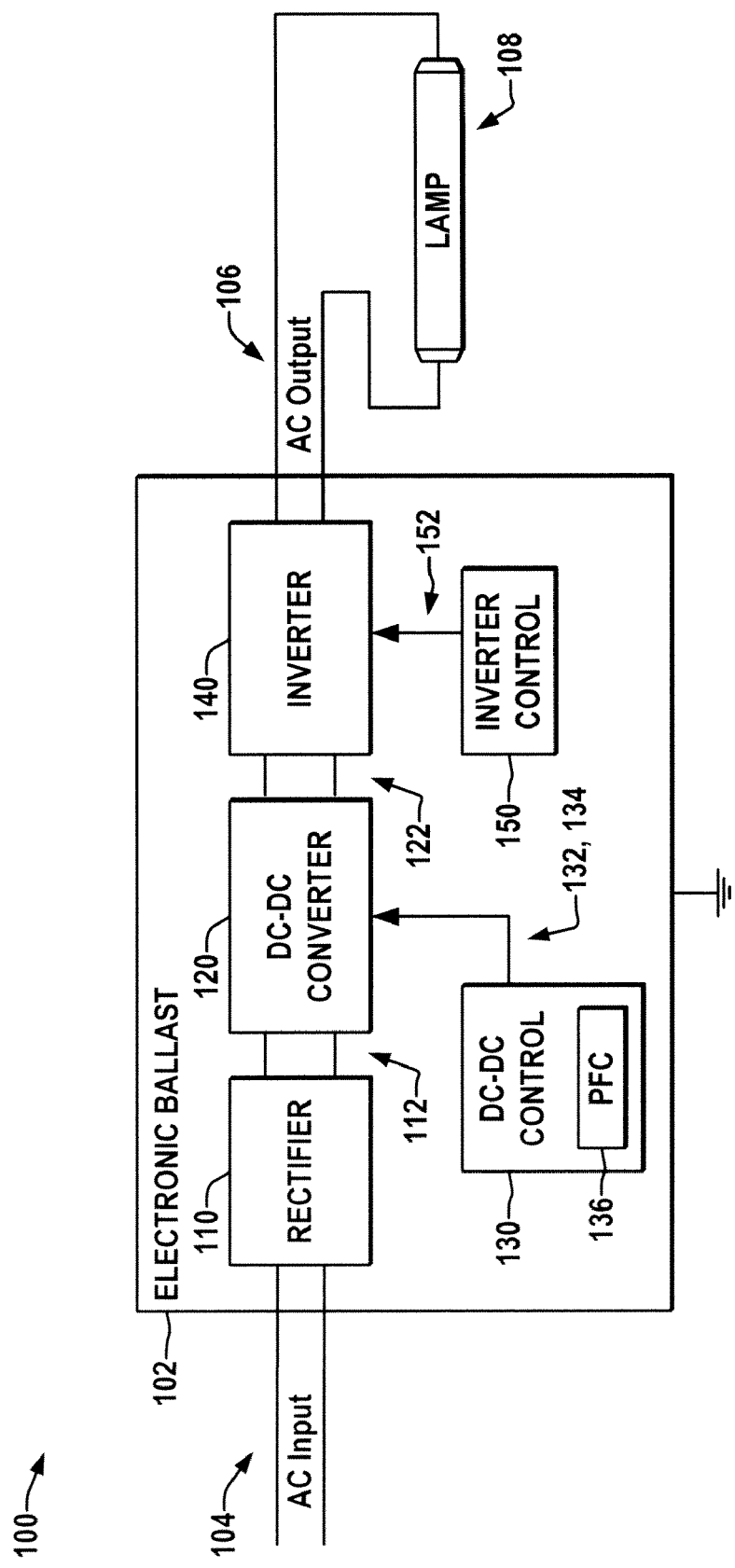
FIG. 1 is a simplified schematic diagram illustrating an exemplary electronic ballast with a power factor correcting DC-DC converter.

Referring now to the drawings, where like reference numerals are used to refer to like elements throughout, and wherein the various features are not necessarily drawn to scale, FIG. 1 illustrates an exemplary electronic ballast 102 with an output 106 for providing AC output power to operate a lamp 108. The ballast 102 includes a rectifier 110 that receives and rectifies single or multi-phase AC power from a ballast input 104, where any form of active or passive, full or half-wave rectifier 110 may be employed, such as a full bridge rectifier having four diodes (not shown) in one embodiment. The rectifier 110 has an output 112 providing a rectified DC voltage to a switching type DC-DC converter 120, which includes various switching devices operated by control signals 132, 134 from a controller 130 to convert the rectified DC voltage into a converter DC output voltage at a converter output 122. The DC-DC converter controller 130 can be any suitable hardware, software, firmware, configurable/programmable logic, or combinations thereof by which suitable switching control signals 132, 134 may be generated for driving the switching devices of the DC-DC converter 120 to implement a desired conversion of the rectified DC to a converter DC output. In certain embodiments, for example, the RMS input voltage is 480 VAC, and the voltage at the converter output 122 can be above 800 VDC. In addition, the converter control 130 in some embodiments includes a power factor control component 136 to control the power factor of the ballast 102. One suitable controller is a conventional PFC controller L6562. Further details of several embodiments of the DC-DC converter 120 are illustrated and described below in connection with FIGS. 2-4. An inverter 140 is operatively coupled to the converter output 122 and converts the converter DC output voltage to provide an AC output voltage to drive a lamp 108 at an inverter output 106, where the inverter 140 may be any suitable DC to AC converter, such as including switching devices operated according to inverter control signals 152 from an inverter controller 150, and which may optionally include a transformer or other isolation components (not shown) to isolate the AC output from the input power.

Figure 2:
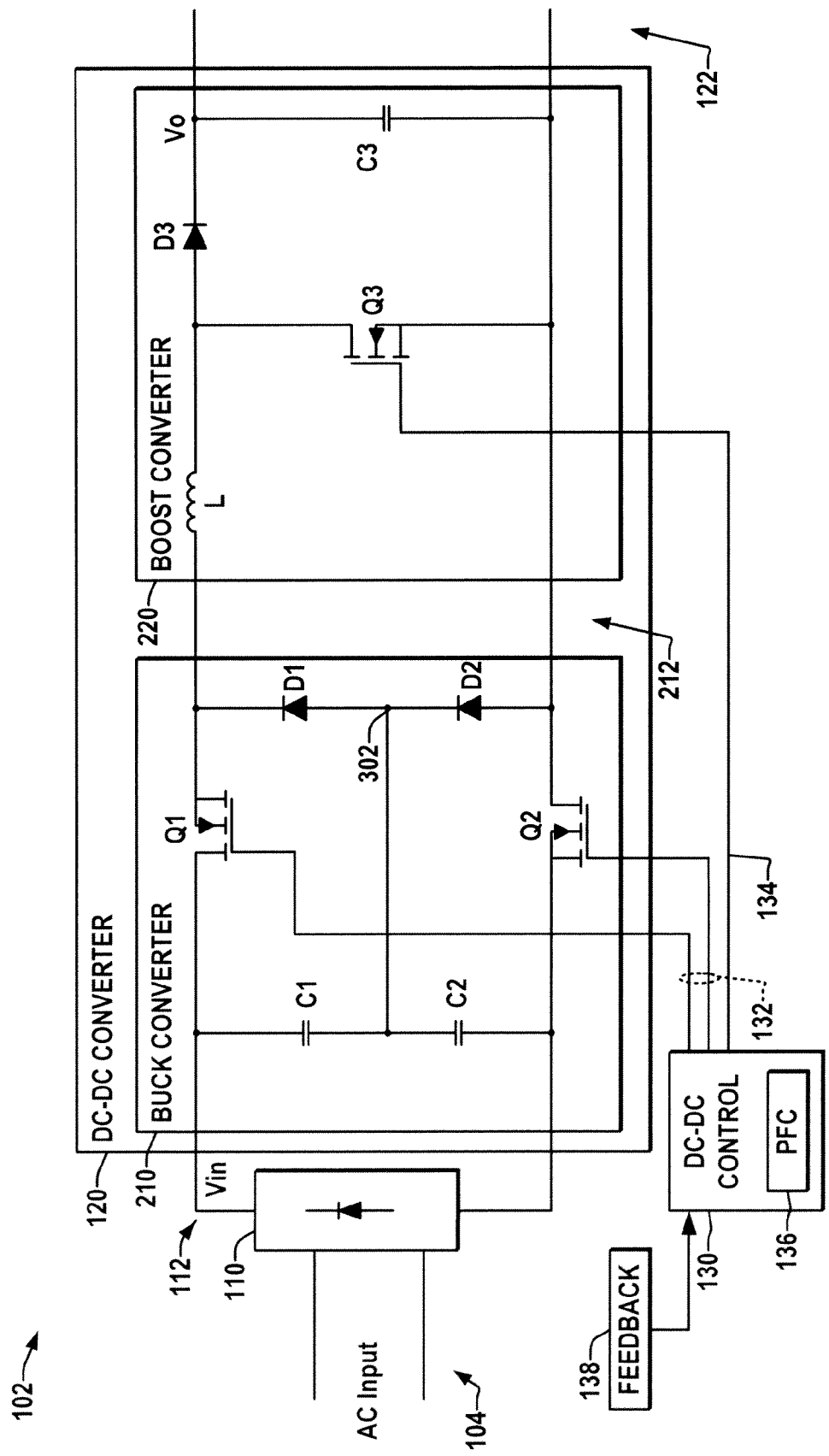
FIG. 2 illustrates a first embodiment of a high input voltage DC-DC converter in the electronic ballast of FIG. 1.

FIG. 2 illustrates further details of one embodiment of the DC-DC converter 120 in the ballast 102, in which a multi-switch buck converter 210 is employed in conjunction with a boost converter 220 to control the voltage levels seen by the individual DC-DC converter switching elements. The buck converter 210 includes an upper circuit branch including a first switching device Q1 coupled between an upper rail of the rectifier output 112 and an upper rail of a buck converter output 212, as well as a lower circuit branch including a second switching device Q2 coupled between a lower rectifier output rail and a lower rail of the buck converter output 212. The switching devices may be any suitable form of switches operable via electrical control signals 132 from the controller 130 to switch between an ON or conducting state and an OFF or non-conductive state, such as MOSFETs or other semiconductor-based switching components or combinations of switching components (e.g., Q1 or Q2 may individually comprise two or more semiconductor-based switches connected in series or parallel for operation to selectively transition between ON and OFF states according to corresponding control signals 132). In one exemplary implementation, the switching devices Q1 and Q2 are N type MOSFET transistors with a drain-source voltage rating of about 600 volts and rated drain current of about 10 amps, such as ST Microelectronics part no. STP10NK60Z for a ballast 102 having an input voltage of 347-480 VAC and an output voltage of about 450V.

The buck converter 120 of FIG. 2 also includes first and second buck converter capacitances C1 and C2 coupled in series in a first circuit branch across the rectifier output 112, which have approximately the same capacitance in certain embodiments. One example is 0.22 µF capacitors C1 and C2 having a voltage rating of about 630 V. In addition, first and second converter diodes D1 and D2 are coupled in series in a second circuit branch across the buck converter output 212 as shown, such as MUR160 type fast recovery diodes in one example. A center node 302 in the second circuit branch between the diodes D1 and D2 is connected in the illustrated embodiment to a center node between the capacitances C1 and C2 in the first circuit branch of the buck converter 210. The buck converter switching devices Q1 and Q2 are operative according to the control signal 132 to selectively convert the rectified DC voltage at the rectifier output 112 to provide an intermediate DC voltage at the buck converter output 212, where the switching control signals 132 provided to the two switching devices Q1 and Q2 may, but need not, be synchronized to turn the switches Q1 and Q2 ON and OFF at the same times. The controller 130, moreover, may employ one or more feedback values or signals 138 in order to implement closed loop control of the DC-DC converter 120 generally or of one or both of the buck and boost converters 210, 220, and may also employ a power factor correction (PFC) component 136 to selectively adjust the buck converter control signal(s) 132 and or a boost converter control signal 134 to control the ballast power factor.

The exemplary boost converter 220 includes an inductance L coupled with the buck converter output 212, as well as a boost converter diode D3 (e.g., MUR 160) coupled between the inductance L and the converter output 122, as well as a boost converter capacitance C3 (e.g., 22 µF, 500V in one example) coupled across the converter output 122, and a boost converter switching device Q3 coupled between the buck converter output 212 and the converter output 122. In one embodiment, Q3 can be of the same type as the buck converter switches Q1 and Q2 (e.g., STP10NK60Z, etc.), and the switch Q3 is operable according to a boost converter control signal 134 to selectively convert the intermediate DC voltage to provide the converter DC output voltage at the converter output 122. In the illustrated embodiments, moreover, the controller 130 provides the buck and boost control signals 132 and 134 in phase such that all the transistors Q1-Q3 are ON at the same time and OFF at the same time, although not a strict requirement of the present disclosure. Unlike conventional cascaded buck-boost DC-DC converters in which switching components may be subjected to voltage stresses up to the level of the rectified DC voltage from the rectifier 110, the capacitances C1, C2 and the buck converter diodes D1, D2 limit the individual voltages across the switching devices Q1, Q2 to around half the rectified DC voltage or less, such as within about 2-5 volts of Vin/2, and thus the converter 120 need not include high voltage switching devices. For example, where the output voltage from the rectifier 110 is about 670 VDC (e.g., for a 480 VAC input), 600 volt switching devices Q1 and Q2 can be used in the buck converter 210 as the highest voltages these devices will experience is approximately 340 volts.

In general, the controller 130 provides the signals 132 and 134 to the two stages 210 and 220 of the converter 120 to cooperatively produce a regulated DC voltage at the converter output 122 for subsequent use by the inverter 140 to power the lamp load 108, and in certain embodiments the controller 130 also regulates the ballast power factor by the provision of the control signals 132, 134. The dual-stage converter 120 thus constitutes a switching regulator in the form of a three-level buck-boost converter having a first state in which all the switches Q1-Q3 are in a conductive (ON) position, and a second state when all switches Q1-Q3 are non-conductive (OFF), with a cycle time of Ton+Toff. When all the switching devices are ON, current from the rectifier 110 flows through the boost converter inductor L that stores energy, and when the switches Q1-Q3 are OFF, the stored energy of the inductor L is transferred to charge the output capacitor C3 at the converter output 122 through diode D3. When the switches Q1-Q3 are ON, moreover, the voltages across the capacitors C1 and C2 and the voltages across the diodes D1 and D2 are Vin/2. In addition, when the switches Q1-Q3 are off, the current from the inductor L flows through the diodes D1 and D2 in the second circuit branch, and even if the buck converter output 212 drops near zero volts, the voltages seen at Q1 and Q2 are less than Vin/2.

Figure 3:
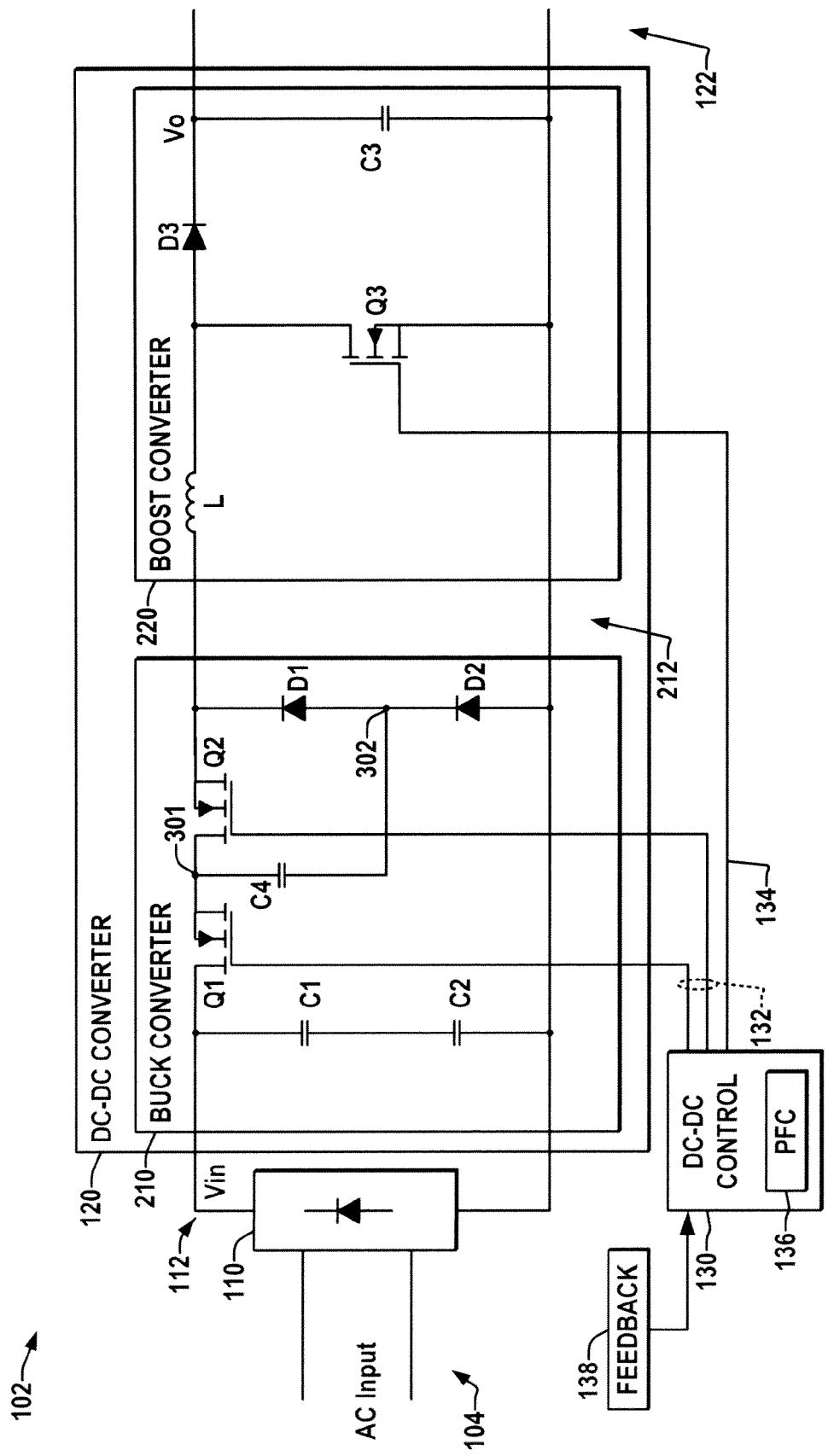
FIG. 3 illustrates a second embodiment of a DC-DC converter in the electronic ballast of FIG. 1.

In order to ensure that the lower branch ground of the DC-DC converter input and output are at the same potential, FIG. 3 illustrates another embodiment, in which both the buck converter switching devices Q1 and Q2 are in the upper circuit branch of the buck converter 210. In this embodiment, the buck converter 210 also includes an additional capacitance C4 coupled between a first node 301 joining the first and second switching devices Q1 and Q2 and a second node 302 joining the first and second buck converter diodes D1 and D2. In one example, the capacitance C4 is 0.1 µF, and is rated at 630V.

Figure 4:
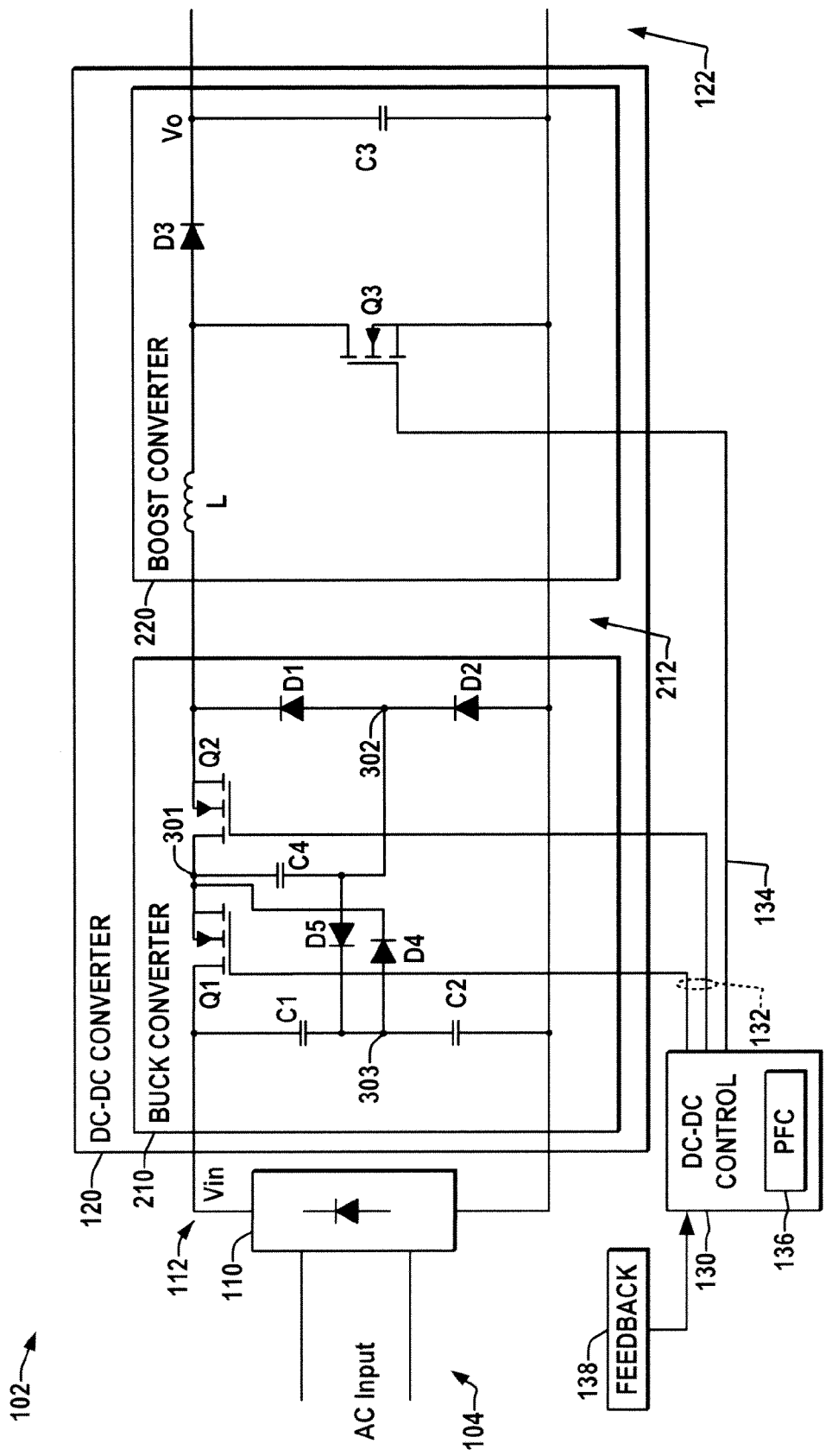
FIG. 4 depicts a third embodiment of a DC-DC converter in the ballast of FIG. 1.

FIG. 4 illustrates yet another embodiment of the DC-DC converter 120, in which a diode D4 is connected in the buck converter having an anode coupled with a node 303 joining the first and second buck converter capacitances C1 and C2 and a cathode coupled with the first node 301, as well as a fourth diode D5 with an anode coupled with the second node 302 and a cathode coupled with the third node 303. In this embodiment, the diodes D4 and D5 facilitate clamping the voltage of the flying capacitance C4 even if the switching devices Q1 and Q2 are actuated at slightly different times. As with the above embodiments of FIGS. 2 and 3, the voltage stress of Q1 and Q2 is half of the input voltage in the three-level buck-boost converter 120 of FIG. 4, thus allowing the use of low voltage devices Q1 and Q2.

In operation of the embodiments of FIGS. 3 and 4, when Q1 and Q2 close or open concurrently, the voltages across C1 and C2 are generally equal (Vin/2) and the voltage across the flying capacitor C4 is clamped to the voltage across C1 (Vin/2), by which the voltage stress on Q1 is half of input voltage at the rectifier output 112. Likewise, the highest voltages seen by Q2, D1, and D2 are Vin/2. In the embodiment of FIG. 4, moreover, when Q1-Q3 are ON, Capacitor C1 will charge C4 as these capacitances form a parallel circuit via Q1 and diode D5, and since the voltage across C1 is Vin/2, the flying capacitor voltage C4 is also Vin/2. As a result, when the switching devices Q1-Q3 are turned OFF, the voltage at node 302 is near zero and the voltage at the node 301 will be near Vin/2 because of the capacitor voltage of C4. Because C4 sets the voltage at node 301 to around Vin/2, the voltage drop across Q1 is approximately Vin/2, and also the voltage drop across Q2 is also near Vin/2. Thus, the flying capacitance C4 in the embodiments of FIGS. 3 and 4 controls the voltage stress of the switching devices Q1 and Q2 to be around Vin/2 or less in operation of the converter 120.

Figure 5:
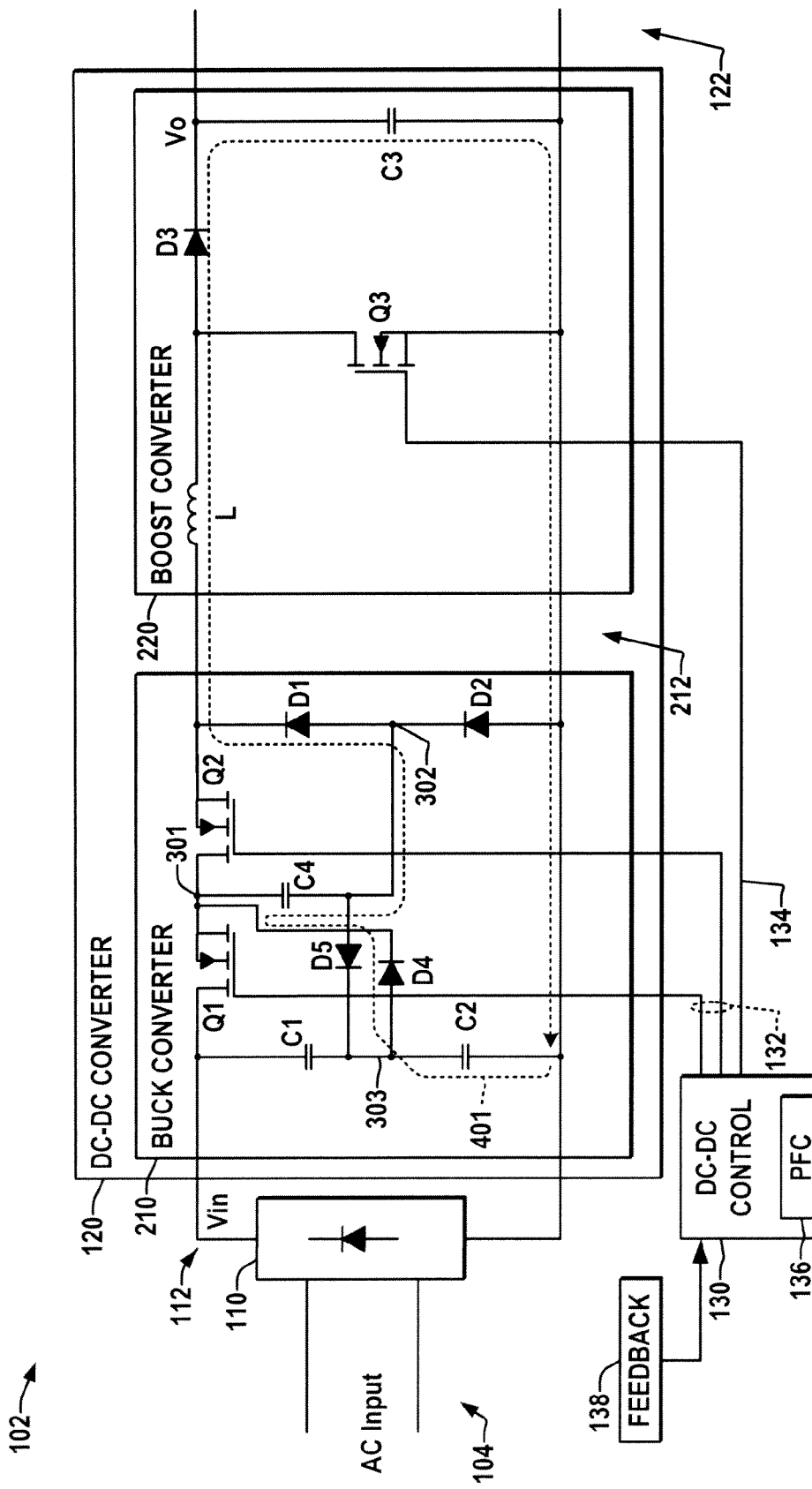
FIG. 5 is a schematic diagram illustrating a first conduction path in the DC-DC converter embodiment of FIG. 4 before activation of a power factor correction controller.

FIG. 5 illustrates the DC-DC converter 120 of FIG. 4 in an initial state prior to activation of the PFC controller 130 in which all the switching devices Q1-Q3 are OFF, such as during start-up of the converter 120. In this situation, the rectifier output 112 (Vin) is imposed across the capacitors C1 and C2, and any circulating currents along a circuit path 401 in the buck converter 210 and boost converter 220 charge the capacitance C4 with diode D4 conducting (ON). In one embodiment where capacitance C4 is much smaller than the boost converter capacitance C3, most of the voltage will be applied to C4 so that the division of voltage is such that the voltage across C4 is approximately equal to the voltage across C2, which is about Vin/2.

Figure 6:
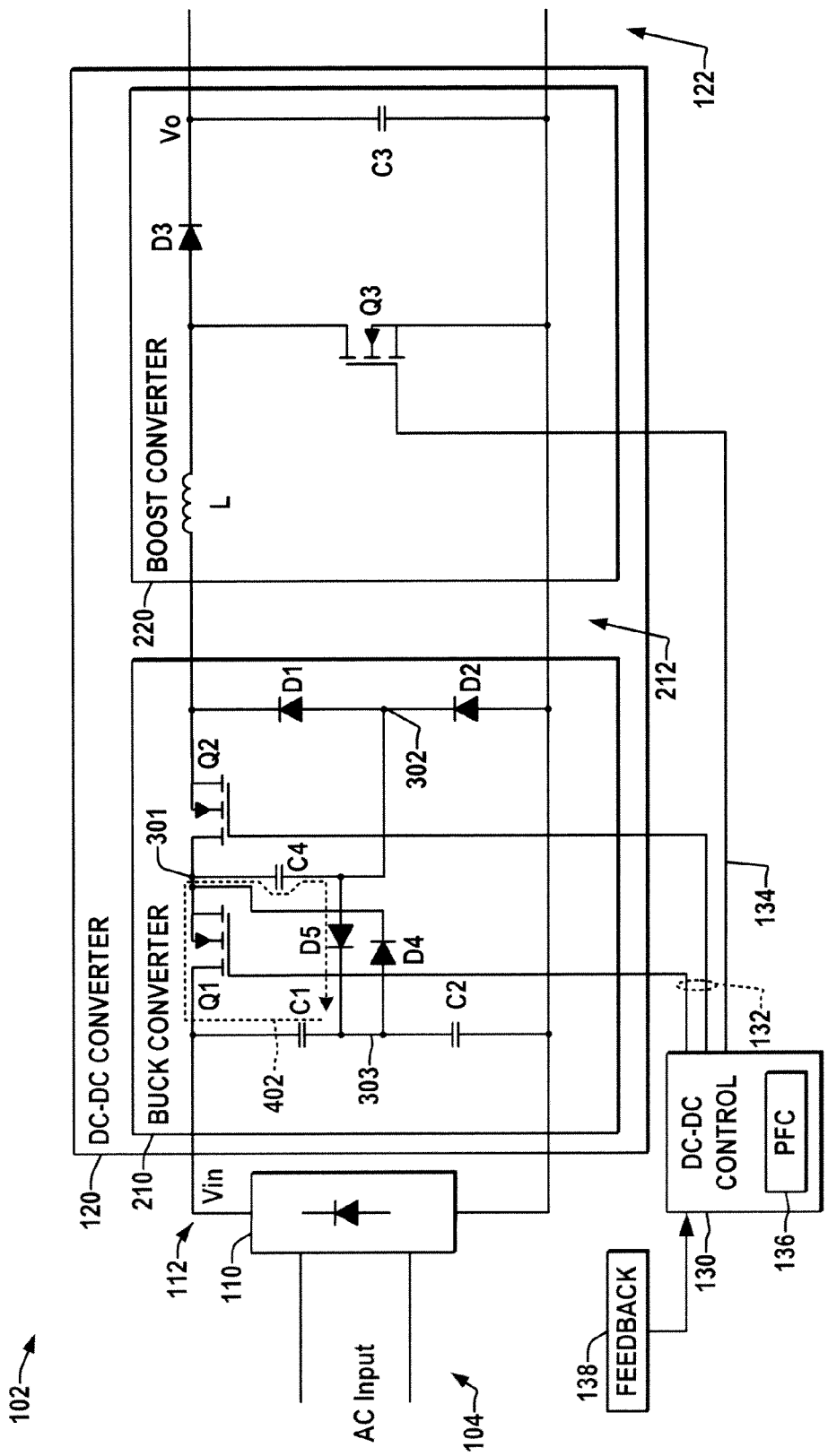
FIG. 6 is a schematic diagram illustrating an exemplary operational state of the converter embodiment of FIGS. 4 and 5 with the first buck converter switching device ON and the other switching devices OFF.
Figure 7:
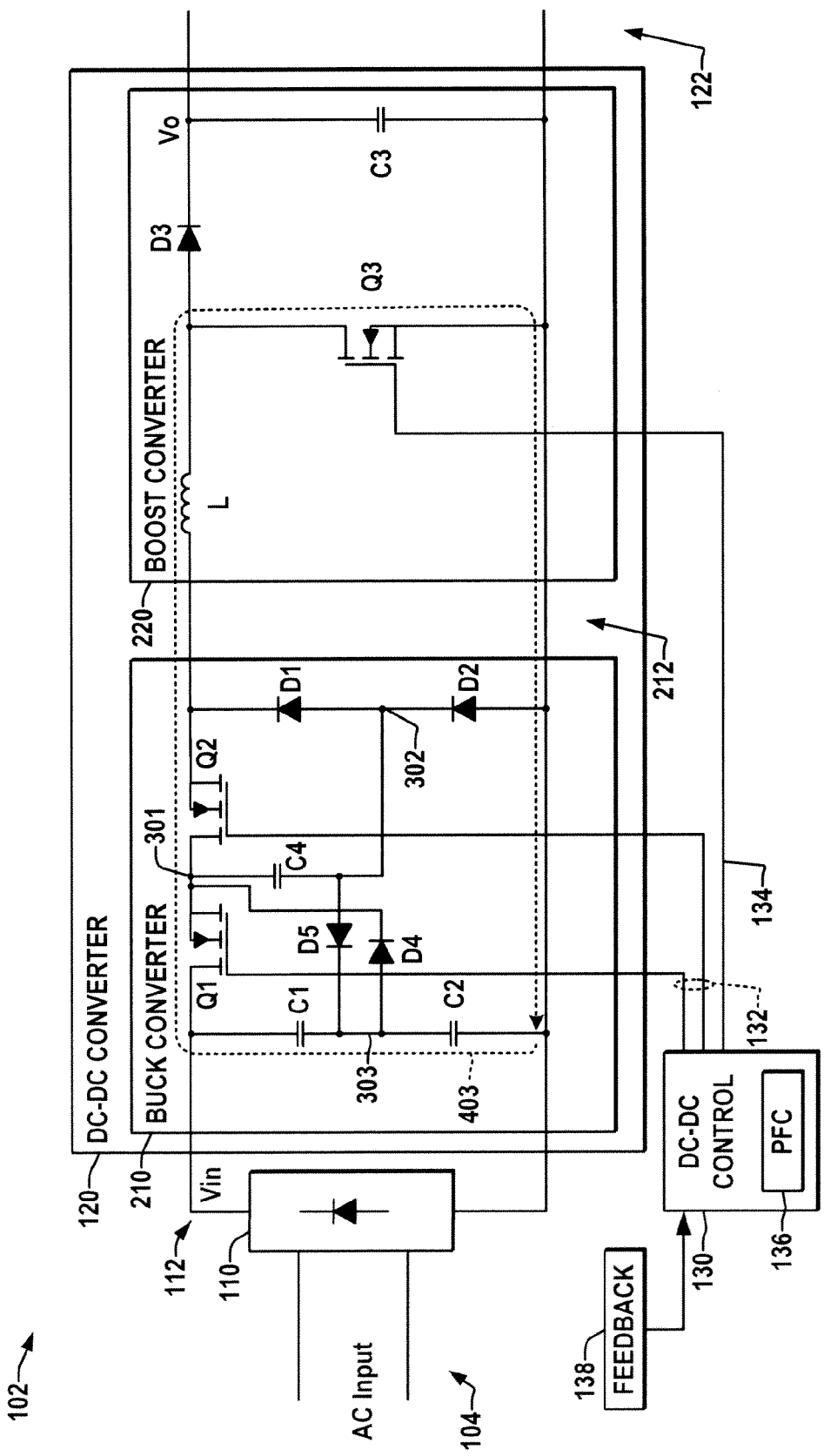
Figure 8:
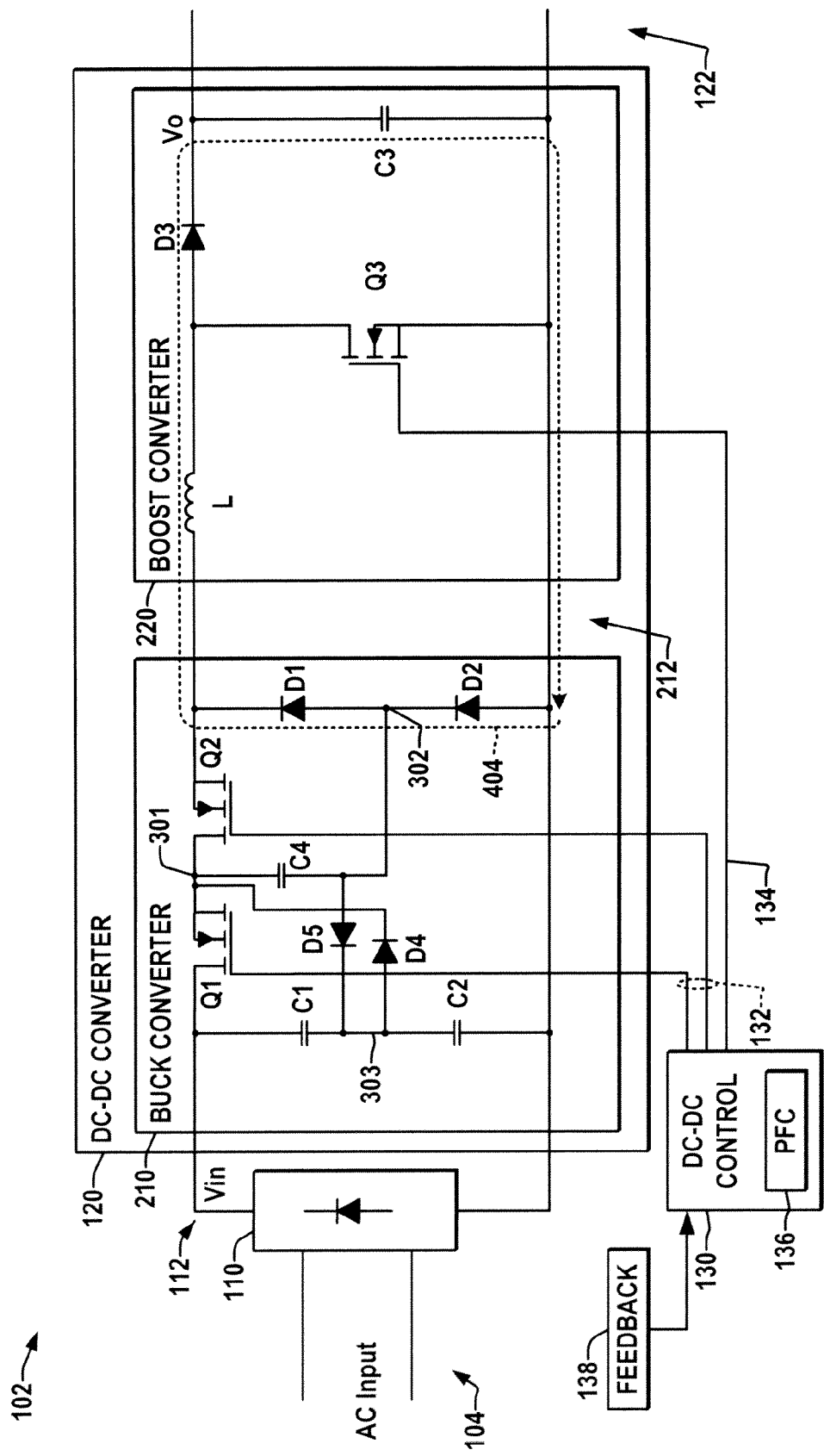
FIG. 8 is a schematic diagram illustrating yet another exemplary operational state of the converter embodiment of FIGS. 4-7 with all three switching devices OFF.

Referring also to FIGS. 6-9, in one implementation of the embodiment of FIG. 4, the buck converter switching devices Q1 and Q2 need not be switched simultaneously, in order to provide further control over the voltage balance between Q1 and Q2. FIG. 6 shows the converter embodiment of FIGS. 4 and 5 in an exemplary operational state with the first buck converter switching device ON. In this condition, when Q1 is turned ON, the capacitance C4 will be charged by capacitance C1 through diode D5 by current flowing in a circuit path 402, and the voltage across these capacitances will be approximately equal (e.g. about Vin/2). Thus, it facilitates the provision of Vin/2 across C4. FIG. 7 shows the converter operational state with all three switching devices Q1-Q3 ON. In this case, current circulates along a circuit path 403 by which energy is stored in the boost converter inductor L. Thereafter all the switching devices Q1-Q3 are turned OFF as shown in FIG. 8. With Q1 and Q2 OFF, the capacitances C1 and C2 are charged by the input voltage such that the voltages of these capacitances C1 and C2 are each around Vin/2, depending on the capacitance matching of these components. In the embodiment of FIGS. 4-8, moreover, even if the switching and other operational characteristics of the buck converter switching devices Q1 and Q2 are different, the use of the diodes D4 and D5 and the capacitance C4 operate to maintain the voltage of C4 at around Vin/2. Moreover, the implementation of a switching delay between activation of Q1 and Q2 (e.g., with Q1 turned OFF before Q2 is turned OFF, the voltage across C4 can be better regulated at around Vin/2 automatically without any complex controls.

Figure 9:
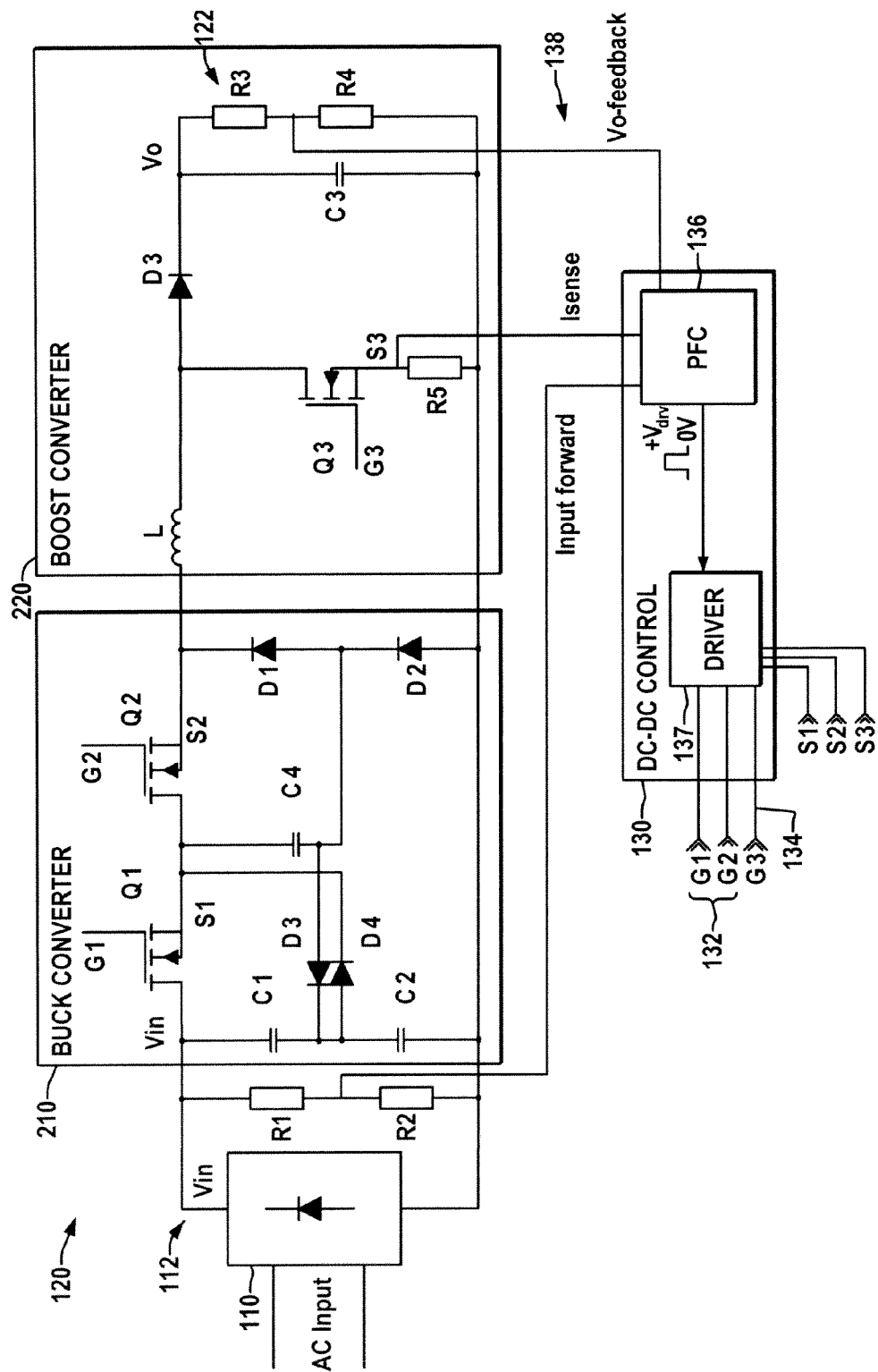
FIG. 9 is a schematic diagram illustrating further details of an exemplary power factor controller in the converter embodiment of FIGS. 4-8.

FIG. 9 illustrates further details of an exemplary power factor controller 130 in the converter embodiment of FIGS. 4-8. As shown in FIG. 9, a rectified voltage (Input forward) is sensed by a voltage divider created using resistors R1 and R2 connected in series across the rectifier output 112, and an output voltage signal Vo-feedback is sensed via a voltage divider created by resistors R3 and R4 connected in series across the converter output 122. Additionally, a resistor R5 is connected between the source S3 of switching device Q3 and the lower circuit ground to sense the current (Isense) through Q3. The sensed feedback signals 138 (Input forward voltage, Vo-feedback output voltage and current signal Isense) are provided to the PFC component 136 of the converter control 130. The PFC component 136 of the control 130 performs voltage regulation and power factor compensation control by providing at least one pulse output to a driver circuit 137, which in turn generates the boost converter control signal 134 to drive the gate G3 of switching device Q3 and also the buck converter control signals 132 driving the gates G1 and G2 of the first and second buck converter switching devices Q1 and Q2, respectively. The driver circuit 137 in one embodiment includes one or more isolation components, such as a transformer to isolate the signals 132, 134, and may further include resistive and capacitive components (not shown) to establish time constant delays to the corresponding gating pulses provided to the switching devices Q1 and Q2, for example, where the time constants may be set differently to implement a delay between the turn-on and/or turn-off times of the switches Q1 and Q2.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has" "with", or variants thereof are used in the detailed description and/or in the claims, such terms are intended to be inclusive in a manner similar to the term "comprising". The invention has been described with reference to the preferred embodiments. Obviously, modifications and alterations will occur to others upon reading and understanding the preceding detailed description. It is intended that the invention be construed as including all such modifications and alterations.

What is claimed is:
1. An electronic ballast for operating a lamp, comprising:
a rectifier configured to receive input AC electrical power and having a rectifier output providing a rectified DC voltage;
a DC-DC converter operative to convert the rectified DC voltage into a converter DC output voltage, the DC-DC converter comprising:

a buck converter comprising:
   first and second buck converter capacitances coupled in series in a first circuit branch across the rectifier output,
   first and second buck converter diodes coupled in series in a second circuit branch across a buck converter output, and
   first and second buck converter switching devices operatively coupled between the rectifier output and the buck converter output and operative according to at least one buck converter control signal to selectively convert the rectified DC voltage to provide an intermediate DC voltage at the buck converter output, and
a boost converter comprising:
   an inductance coupled with the buck converter output,
   a boost converter diode coupled between the inductance and a converter output,
   a boost converter capacitance coupled across the converter output, and
   a boost converter switching device coupled between the buck converter output and the converter output, and operable according to a boost converter control signal to selectively convert the intermediate DC voltage to provide the converter DC output voltage at the converter output; and
an inverter operatively coupled to the converter output and operative to convert the converter DC output voltage to provide an AC output voltage at an inverter output to drive a lamp.

2. The electronic ballast of claim 1, further comprising a DC-DC converter controller providing the at least one buck converter control signal to selectively convert the rectified DC voltage into the intermediate DC voltage at the buck converter output and providing the boost converter control signal to selectively convert the intermediate DC voltage to the converter DC output voltage, the controller having a power factor control operative to selectively adjust one or more of the at least one buck converter control signal and the boost converter control signal to control a power factor of the electronic ballast.

3. The electronic ballast of claim 2, where the buck converter capacitances and the buck converter diodes limit the individual voltages across the first and second buck converter switching devices to around half the rectified DC voltage or less.

4. The electronic ballast of claim 3, where the buck converter includes upper and lower circuit branches between the rectifier output and the buck converter output, where one of the buck converter switching devices is in the upper circuit branch, and where the other of the buck converter switching devices is in the lower circuit branch.

5. The electronic ballast of claim 3, where the buck converter includes upper and lower circuit branches between the rectifier output and the buck converter output, and where both the buck converter switching devices are in the upper circuit branch, the buck converter further comprising a third buck converter capacitance coupled between a first node joining the first and second buck converter switching devices and a second node joining the first and second buck converter diodes.

6. The electronic ballast of claim 5, where the buck converter further comprises a third diode with an anode coupled with a third node joining the first and second buck converter capacitances and a cathode coupled with the first node, and a fourth diode with an anode coupled with the second node and a cathode coupled with the third node.

7. The electronic ballast of claim 1, where the buck converter capacitances and the buck converter diodes limit the individual voltages across the first and second buck converter switching devices to around half the rectified DC voltage or less.

8. The electronic ballast of claim 7, where the buck converter includes upper and lower circuit branches between the rectifier output and the buck converter output, where one of the buck converter switching devices is in the upper circuit branch, and where the other of the buck converter switching devices is in the lower circuit branch.

9. The electronic ballast of claim 7, where the buck converter includes upper and lower circuit branches between the rectifier output and the buck converter output, and where both the buck converter switching devices are in the upper circuit branch, the buck converter further comprises a third buck converter capacitance coupled between a first node joining the first and second buck converter switching devices and a second node joining the first and second buck converter diodes.

10. The electronic ballast of claim 9, where the buck converter further comprises a third diode with an anode coupled with a third node joining the first and second buck converter capacitances and a cathode coupled with the first node, and a fourth diode with an anode coupled with the second node and a cathode coupled with the third node.

11. The electronic ballast of claim 7, where the buck converter includes upper and lower circuit branches between the rectifier output and the buck converter output, where one of the buck converter switching devices is in the upper circuit branch, and where the other of the buck converter switching de vices is in the lower circuit branch.

12. The electronic ballast of claim 9, where the buck converter includes upper and lower circuit branches between the rectifier output and the buck converter output, and where both the buck converter switching devices are in the upper circuit branch, the buck converter further comprises a third buck converter capacitance coupled between a first node joining the first and second buck converter switching devices and a second node joining the first and second buck converter diodes.

13. The electronic ballast of claim 12, where the buck converter further comprises a third diode with an anode coupled with a third node joining the first and second buck converter capacitances and a cathode coupled with the first node, and a fourth diode with an anode coupled with the second node and a cathode coupled with the third node.

14. A DC-DC converter for converting a rectified DC voltage to a converter DC output voltage in an electronic ballast, the DC-DC converter comprising:
a buck converter comprising:
   first and second buck converter capacitances coupled in series in a first circuit branch across the rectified DC voltage,
   first and second buck converter diodes coupled in series in a second circuit branch across a buck converter output, and
   first and second buck converter switching devices operatively coupled between the rectified DC voltage and the buck converter output and operative according to at least one buck converter control signal to selectively convert the rectified DC voltage to provide an intermediate DC voltage at the buck converter output; and a boost converter comprising:
an inductance coupled with the buck converter output, a boost converter diode coupled between the inductance and a converter output,
a boost converter capacitance coupled across the converter output, and
a boost converter switching device coupled between the buck converter output and the converter output, and operable according to a boost converter control signal to selectively convert the intermediate DC voltage to provide the converter DC output voltage at the converter output.

15. The DC-DC converter of claim 14, where the buck converter capacitances and the buck converter diodes limit the individual voltages across the first and second buck converter switching devices to around half the rectified DC voltage or less.

16. The DC-DC converter of claim 15, where the buck converter includes upper and lower circuit branches between the rectified DC voltage and the buck converter output, and where both the buck converter switching devices are in the upper circuit branch, the buck converter further comprising:
a third buck converter capacitance coupled between a first node joining the first and second buck converter switching devices and a second node joining the first and second buck converter diodes;
a third diode with an anode coupled with a third node joining the first and second buck converter capacitances and a cathode coupled with the first node; and
a fourth diode with an anode coupled with the second node and a cathode coupled with the third node.

17. The DC-DC converter of claim 14, where the buck converter includes upper and lower circuit branches between the rectified DC voltage and the buck converter output, where one of the buck converter switching devices is in the upper circuit branch, and where the other of the buck converter switching devices is in the lower circuit branch.

18. The DC-DC converter of claim 14, where the buck converter includes upper and lower circuit branches between the rectified DC voltage and the buck converter output, and where both the buck converter switching devices are in the upper circuit branch, the buck converter further comprising a third buck converter capacitance coupled between a first node joining the first and second buck converter switching devices and a second node joining the first and second buck converter diodes.

19. The DC-DC converter of claim 18, where the buck converter further comprises:
a third diode with an anode coupled with a third node joining the first and second buck converter capacitances and a cathode coupled with the first node; and
a fourth diode with an anode coupled with the second node and a cathode coupled with the third node.

20. The DC-DC converter of claim 14, further comprising a DC-DC converter controller providing the at least one buck converter control signal to selectively convert the rectified DC voltage into the intermediate DC voltage at the buck converter output and providing the boost converter control signal to selectively convert the intermediate DC voltage to the converter DC output voltage, the controller having a power factor control operative to selectively adjust one or more of the at least one buck converter control signal and the boost converter control signal to control a power factor of the electronic ballast.

21. The DC-DC converter of claim 14, further comprising a DC-DC converter controller providing the at least one buck converter control signal to selectively convert the rectified DC voltage into the intermediate DC voltage at the buck converter output and providing the boost converter control signal to selectively convert the intermediate DC voltage to the converter DC output voltage, the controller operative to selectively provide the buck converter control signals such that the first and second buck converter switching devices turn off at different times.

* * * * *